United States Patent
Kono et al.

(10) Patent No.: US 10,502,322 B2
(45) Date of Patent: Dec. 10, 2019

(54) SPLIT TYPE BRUSH SEAL DEVICE, BRUSH SEAL PIECES, AND METHOD OF ASSEMBLING SPLIT TYPE BRUSH SEAL DEVICE

(71) Applicant: Eagle Industry Co., Ltd., Tokyo (JP)

(72) Inventors: Toru Kono, Tokyo (JP); Ryu Kikuchi, Tokyo (JP); Norihiko Saito, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 3 days.

(21) Appl. No.: 15/551,568

(22) PCT Filed: Mar. 3, 2016

(86) PCT No.: PCT/JP2016/056565
§ 371 (c)(1),
(2) Date: Aug. 16, 2017

(87) PCT Pub. No.: WO2016/143657
PCT Pub. Date: Sep. 15, 2016

(65) Prior Publication Data
US 2018/0045317 A1    Feb. 15, 2018

(30) Foreign Application Priority Data
Mar. 9, 2015   (JP) .................................. 2015-045767

(51) Int. Cl.
*F16J 15/3268*   (2016.01)
*F01D 11/00*   (2006.01)
(Continued)

(52) U.S. Cl.
CPC ........... *F16J 15/3268* (2013.01); *F01D 11/00* (2013.01); *F16J 15/328* (2013.01);
(Continued)

(58) Field of Classification Search
CPC .. F16J 15/3288; F16J 15/3292; F16J 15/3268; F05B 2240/571; F01D 11/00; F01D 11/001; F05D 2240/56
See application file for complete search history.

(56) References Cited

U.S. PATENT DOCUMENTS 2,878,048 A * 3/1959 Peterson ................. F16C 33/78
                                                     277/355
5,114,159 A * 5/1992 Baird ........................ F01D 5/10
                                                     277/355
(Continued)

FOREIGN PATENT DOCUMENTS

CN    1228505    9/1999   ............. F01D 11/00
CN    1573023    2/2005   ............. F16J 15/32
(Continued)

OTHER PUBLICATIONS

Chinese Office Action (w/translation) issued in application No. 201680010495.3, dated May 22, 2018 (9 pgs).
(Continued)

Primary Examiner — Eugene G Byrd
(74) Attorney, Agent, or Firm — Hayes Soloway P.C.

(57) ABSTRACT

Provided is a split type brush seal device, brush seal pieces, and a method of assembling a split type brush seal device in which the brush seal pieces can be applied to an attached portion having an acceptable curvature. The split type brush seal device includes plural brush seal pieces having bundled wire rods, and attached members in which the plural brush seal pieces are attached to attached portions in the circumferential direction. Each of the brush seal pieces has a plate of arc shape to which the bundled wire rods are fixed. The split type brush seal device further includes a biasing member that forcibly cause a curvature of the plate to approximate to a curvature of the attached portion.

4 Claims, 11 Drawing Sheets

(51) Int. Cl.
*F16J 15/328* (2016.01)
*F16J 15/3288* (2016.01)

(52) U.S. Cl.
CPC ....... *F16J 15/3288* (2013.01); *F05D 2230/60* (2013.01); *F05D 2240/56* (2013.01)

(56) References Cited

U.S. PATENT DOCUMENTS

| | | | | |
|---|---|---|---|---|
| 6,105,966 | A | 8/2000 | Turnquist et al. | 277/355 |
| 6,109,616 | A * | 8/2000 | Mayr | F16J 15/3288 |
| | | | | 277/355 |
| 6,257,588 | B1 | 7/2001 | Bagepalli et al. | 277/355 |
| 6,390,476 | B1 | 5/2002 | Tong et al. | 277/355 |
| 6,464,230 | B1 | 10/2002 | Tong et al. | 277/355 |
| 6,874,787 | B2 * | 4/2005 | Kono | F16J 15/3288 |
| | | | | 277/355 |
| 7,077,573 | B2 * | 7/2006 | Suh | F16C 27/02 |
| | | | | 277/355 |
| 8,181,965 | B2 | 5/2012 | Addis | 277/355 |
| 8,919,633 | B2 * | 12/2014 | Cui | F01D 11/001 |
| | | | | 219/121.14 |
| 9,234,592 | B2 * | 1/2016 | Inoue | F01D 11/001 |
| 9,255,486 | B2 * | 2/2016 | Lu | F01D 11/001 |
| 2004/0041348 | A1 * | 3/2004 | Addis | F01D 11/005 |
| | | | | 277/355 |
| 2004/0256810 | A1 | 12/2004 | Nakano et al. | 277/402 |
| 2006/0267291 | A1 | 11/2006 | Addis | 277/355 |
| 2007/0252336 | A1 * | 11/2007 | Grabeldinger | F01D 11/025 |
| | | | | 277/355 |
| 2008/0290605 | A1 * | 11/2008 | Brockmeier | A61B 17/3462 |
| | | | | 277/355 |
| 2009/0315272 | A1 * | 12/2009 | Kasahara | F01D 11/003 |
| | | | | 277/355 |
| 2010/0068042 | A1 * | 3/2010 | Bruck | F01D 11/001 |
| | | | | 415/174.2 |
| 2011/0123329 | A1 * | 5/2011 | Takeuchi | F01D 11/001 |
| | | | | 415/230 |
| 2013/0001883 | A1 * | 1/2013 | Addis | F16J 15/3288 |
| | | | | 277/355 |
| 2013/0170979 | A1 * | 7/2013 | Sha | F01D 11/001 |
| | | | | 415/229 |
| 2013/0277918 | A1 * | 10/2013 | Fitzgerald | F01D 11/00 |
| | | | | 277/355 |
| 2013/0300067 | A1 * | 11/2013 | Sakekar | F01D 11/001 |
| | | | | 277/355 |
| 2014/0301848 | A1 * | 10/2014 | Valero Lafuente | F16J 15/3288 |
| | | | | 416/174 |

FOREIGN PATENT DOCUMENTS

| | | | |
|---|---|---|---|
| EP | 0989341 | 3/2000 | ............... F16J 15/32 |
| JP | 2000154875 | 6/2000 | ............... F01D 11/00 |
| JP | 2001050396 | 2/2001 | ............... F16J 15/22 |
| JP | 2003004145 | 1/2003 | ............... F01D 11/02 |
| JP | 2006329424 | 12/2006 | ............... F04B 39/00 |
| JP | 2007263376 | 10/2007 | ............... F16J 15/22 |
| JP | 4080963 | 4/2008 | ............... F01D 11/00 |
| JP | 2008121512 | 5/2008 | ............... F01D 11/00 |
| JP | 2015232330 A * | 12/2015 | ........... F16J 15/3288 |
| WO | WO2008004590 | 1/2008 | ............... F01D 11/00 |

OTHER PUBLICATIONS

International Preliminary Report on Patentability issued in application No. PCT/2016/056565, dated Sep. 12, 2017 (10 pgs).
International Search Report and Written Opinion issued in application No. PCT/JP2016/056565, dated Apr. 12, 2016 (15 pgs).
Korean Office Action (w/translation) issued in application No. 10-2017-7024049, dated Jun. 15, 2018 (14 pgs).
European search report issued in application No. 16761627.5, dated Dec. 12, 2018 (9 pgs).
Chinese Office Action issued in application No. 201680010495.3, dated Feb. 3, 2019 (12 pgs).
Chinese Office Action (w/translation) issued in application No. 201680010495.3, dated Jul. 31, 2019 (11 pgs)

* cited by examiner

SPLIT TYPE BRUSH SEAL DEVICE, BRUSH SEAL PIECES, AND METHOD OF ASSEMBLING SPLIT TYPE BRUSH SEAL DEVICE

TECHNICAL FIELD

The present invention relates to a split type brush seal device that seals a clearance between two relatively rotating members of a rotary machine such as a turbine, brush seal pieces, and a method of assembling a split type brush seal device.

BACKGROUND ART

In a rotary machine such as a turbine, a seal device is used for suppressing leakage of gas from the high pressure side to the low pressure side along the circumference of a rotor. It is desired that a seal follows variations of a clearance between a stator and the rotor of the rotary machine and eccentricity between the stator and the rotor and exerts sealing performance. From such a viewpoint, a brush seal in which bundled wire rods are fixed to a metal plate is adopted in place of a labyrinth seal. In order to simplify tasks of attaching and detaching the brush seal to the rotary machine, a split type brush seal device in which a brush seal is divided into arc brush seal pieces and plural brush seal pieces are placed side by side in the circumferential direction is proposed (for example, refer to Patent Literatures 1, 2).

CITATION LIST

Patent Literature

Patent Literature 1: Japanese Laid-open Patent Publication 2008-121512 ([0025], FIGS. 2 and 3)
Patent Literature 2: PCT International Application No. WO/2008/004590 ([0018] to [0023], FIGS. 1 to 4)

SUMMARY OF INVENTION

Technical Problem

Figure 10:
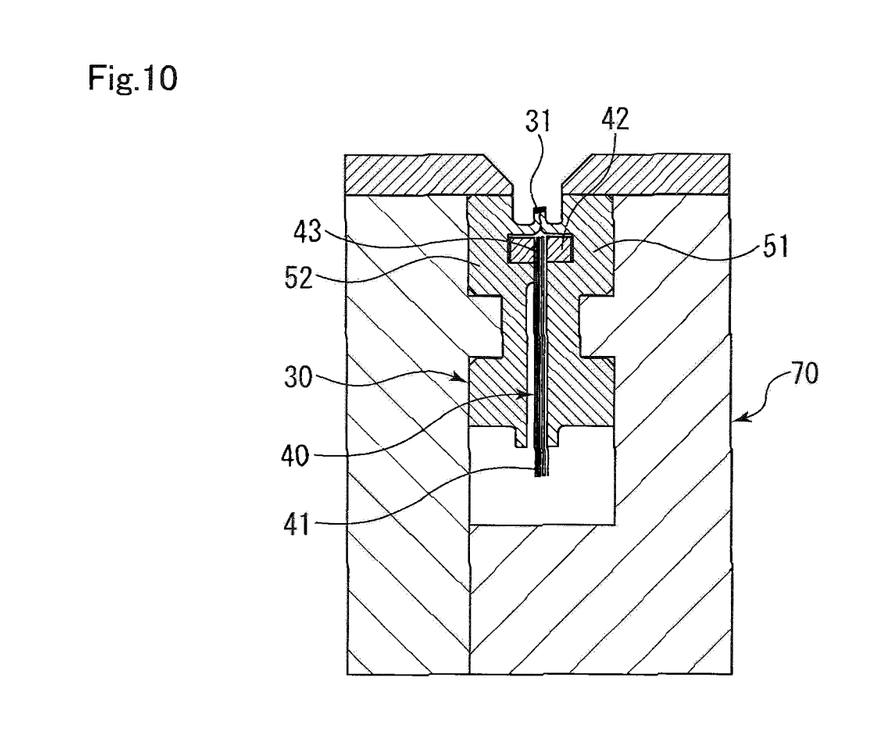
FIG. 10 is a sectional view for illustrating assembling of a conventional brush seal piece.
Figure 11:
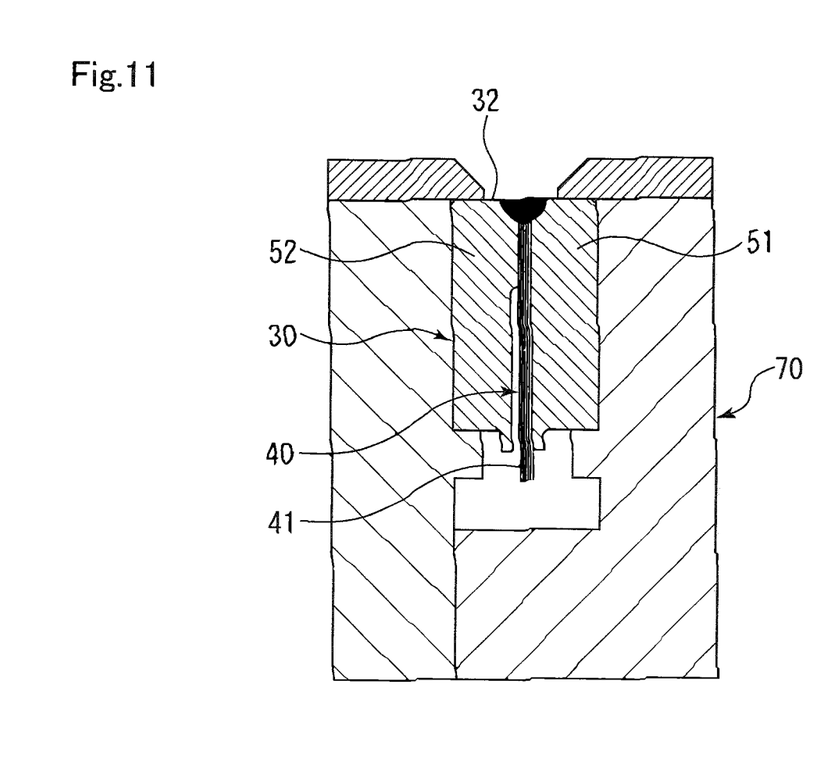
FIG. 11 is a sectional view for illustrating assembling of a conventional brush seal piece.

As shown in FIG. 10, in a brush seal piece 30 of a split type brush seal device, a brush 40 in which bundled wire rods 41 are fixed to an attachment portion 42 by welding 43 is nipped by metal plates 51, 52 and temporarily fixed to an assembling welding jig 70, and an outer circumference of the pair of metal plates 51, 52 is assembled by welding 31 in a state where the metal plates 51, 52 are placed along a curvature of the assembling welding jig 70. Alternatively, as shown in FIG. 11, in a brush seal piece 30 of a split type brush seal device, bundled wire rods 41 are nipped by metal plates 51, 52 and temporarily fixed to an assembling welding jig 70, and three parts consisting of the wire rods 41 and the metal plates 51, 52 are assembled by welding 32 in a state where the metal plates 51, 52 are placed along a curvature of the assembling welding jig 70. Therefore, even when a sectional shape in the radial direction of the brush seal piece 30 is the same, the assembling welding jig 70 is required for every curvature of an attachment member of the rotary machine to which the brush seal piece 30 is attached.

The present invention has been achieved focusing on such a problem, and an objective thereof is to provide a split type brush seal device in which brush seal pieces can be applied to an attached portion having an acceptable curvature, brush seal pieces, and a method of assembling a split type brush seal device.

Solution to Problem

In order to solve the foregoing problem, a split type brush seal device according to a first aspect of the present invention including:
a plurality of brush seal pieces having bundled wire rods; and
an attached member in which the plurality of brush seal pieces is attached to an attached portion in the circumferential direction, is characterized in that:
each of the brush seal pieces has a plate of arc shape to which the bundled wire rods are fixed; and
the split type brush seal device further comprises biasing means that forcibly causes a curvature of the plate to approximate to a curvature of the attached portion.

According to the first aspect, the curvature of the plate can be approximated to the curvature of the attached portion. Thus, the plate can be applied to the attached member having the attached portion having the approximated and acceptable curvature. As a result, the number of jigs for assembling the brush seal pieces can be reduced.

The split type brush seal device according to a second aspect of the present invention is characterized in that the biasing means is a fastening member that fastens the plate to the attached member in the radial direction.

According to the second aspect, the direction in which the fastening member fastens is identical with a direction in which the plate is deformed so that the curvature of the plate is approximated to the curvature of the attached portion. Thus, the plate can be deformed following a fastening task of the fastening member, and assembling workability is favorable.

The split type brush seal device according to a third aspect of the present invention is characterized in that the biasing means is a fastening member that fastens the plate to the attached member in the circumferential direction.

According to the third aspect, there is no need for providing a fastening member on the distal end side of the wire rods. Thus, the design flexibility of the plate on the distal end side of the wire rods is high.

The split type brush seal device according to a fourth aspect of the present invention is characterized in that the plurality of brush seal pieces are attached to the attached member, and each of the brush seal pieces has a mating structure for regulating radial movement mutually with the adjoining brush seal piece.

According to the fourth aspect, even in a case where the number of divided portions is different between the brush seal piece and the attached member, distal ends of the wire rods of the adjoining brush seal pieces can be formed in a shape along an arc.

The split type brush seal device according to a fifth aspect of the present invention is characterized in that the biasing means is configured to deform the plate and cause the curvature of the plate to approximate to the curvature of the attached portion at least before the plate is attached to the attached portion.

According to the fifth aspect, before the plate is attached to the attached portion, the plate is deformed and the curvature is changed. Thus, a task of attaching the plate to the attached portion is simple.

Brush seal pieces of a split type brush seal device according to a sixth aspect of the present invention, the brush seal pieces being attached to an attached portion of an attached member in the circumferential direction, are characterized in that:

each of the brush seal pieces includes a plate of arc shape to which bundled wire rods are fixed; and the plate has a plurality of receiving portions that receive a biasing force in the radial direction upon the attachment of the brush seal pieces.

According to the sixth aspect, the biasing force is received by the plurality of receiving portions. Thus, the curvature of the plate can be changed.

The brush seal pieces of the split type brush seal device according to a seventh aspect of the present invention is characterized in that each of the brush seal pieces has a mating structure for regulating radial movement mutually with the adjoining brush seal piece.

According to the seventh aspect, the adjoining brush seal pieces can be simply positioned relative to each other.

A method of assembling a split type brush seal device according to an eighth aspect of the present invention is characterized by including the steps of:

preparing a brush seal piece in which bundled wire rods are fixed to a plate of arc shape;

preparing an attached member provided with an attached portion of arc shape, the attachment portion having a different curvature from the plate; and attaching the plate to the attached portion so that a curvature difference is reduced between the plate and the attached portion.

According to the eighth aspect, the plate can be attached along the curvature of the attached portion. Thus, even when the curvature is different between the plate and the attached portion, the plate can be applied to the attached portion having the approximated and acceptable curvature.

The method of assembling the split type brush seal device according to a ninth aspect of the present invention is characterized in that the step of attaching is performed by using a fastening member.

According to the ninth aspect, attachment is performed by using the fastening member. Thus, the curvature of the plate can surely coincide with a desired curvature.

BRIEF DESCRIPTION OF DRAWINGS

FIG. 3 is an illustrative view showing assembling of a brush seal piece of the first embodiment.

FIG. 4 is a view illustrating a change in a curvature of the brush seal piece of the first embodiment.

FIG. 5(a) is a view showing a state before both end portions of the brush seal piece are fastened; and FIG. 5(b) is a view showing a state after both the end portions are fastened;

FIG. 6 is a perspective view showing a modified example of a brush seal piece of a third embodiment.

FIG. 7 is a sectional view of a split type brush seal device of the third embodiment.

FIG. 8 is a view illustrating a change in a curvature of brush seal pieces of a fourth embodiment.

DESCRIPTION OF EMBODIMENTS

Modes for implementing a split type brush seal device, brush seal pieces, and a method of assembling a split type brush seal device will be described below on the basis of embodiments.

First Embodiment

Figure 1:
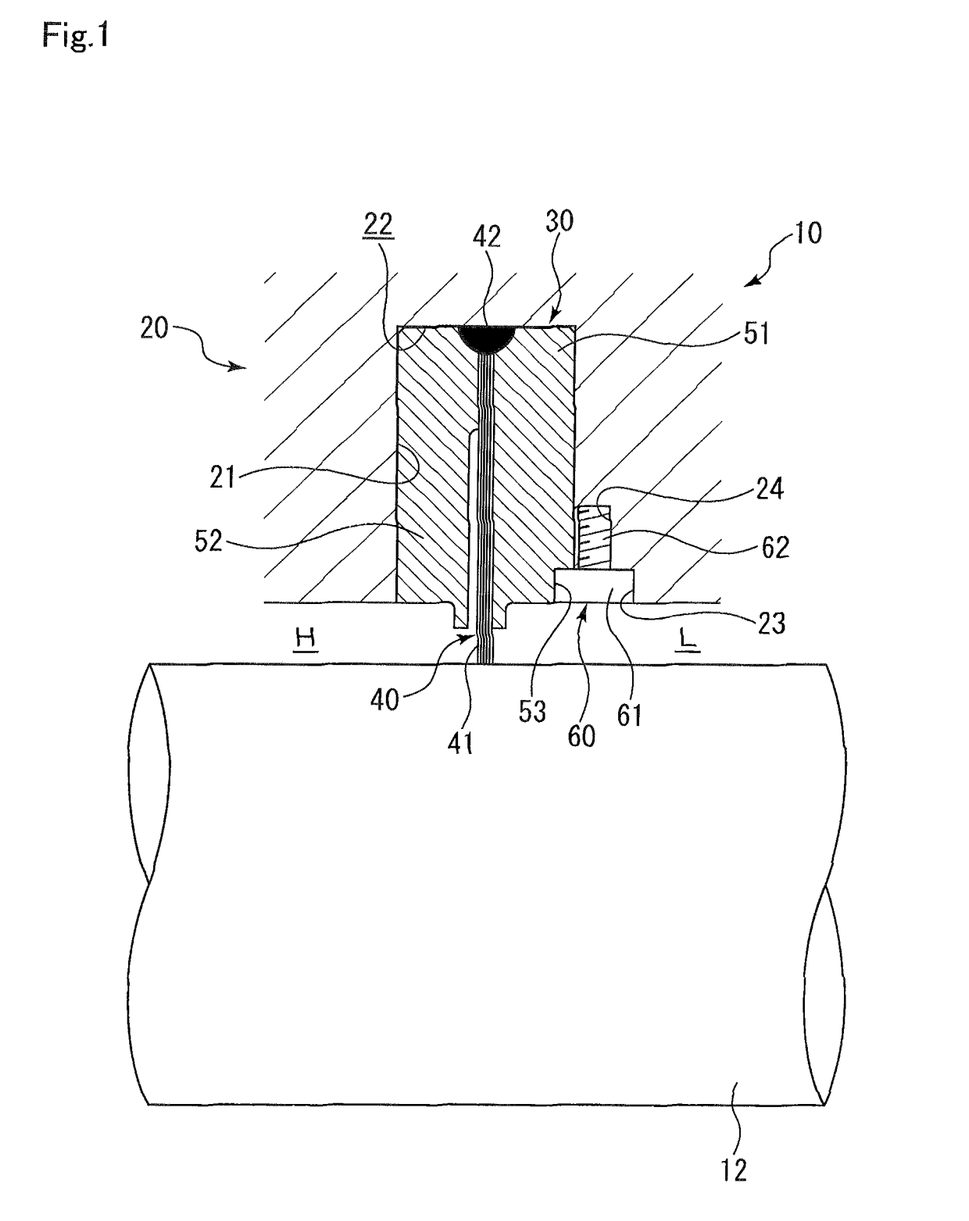
FIG. 1 is a sectional view showing a state where a split type brush seal device in a first embodiment is assembled in a rotary machine.
Figure 2:
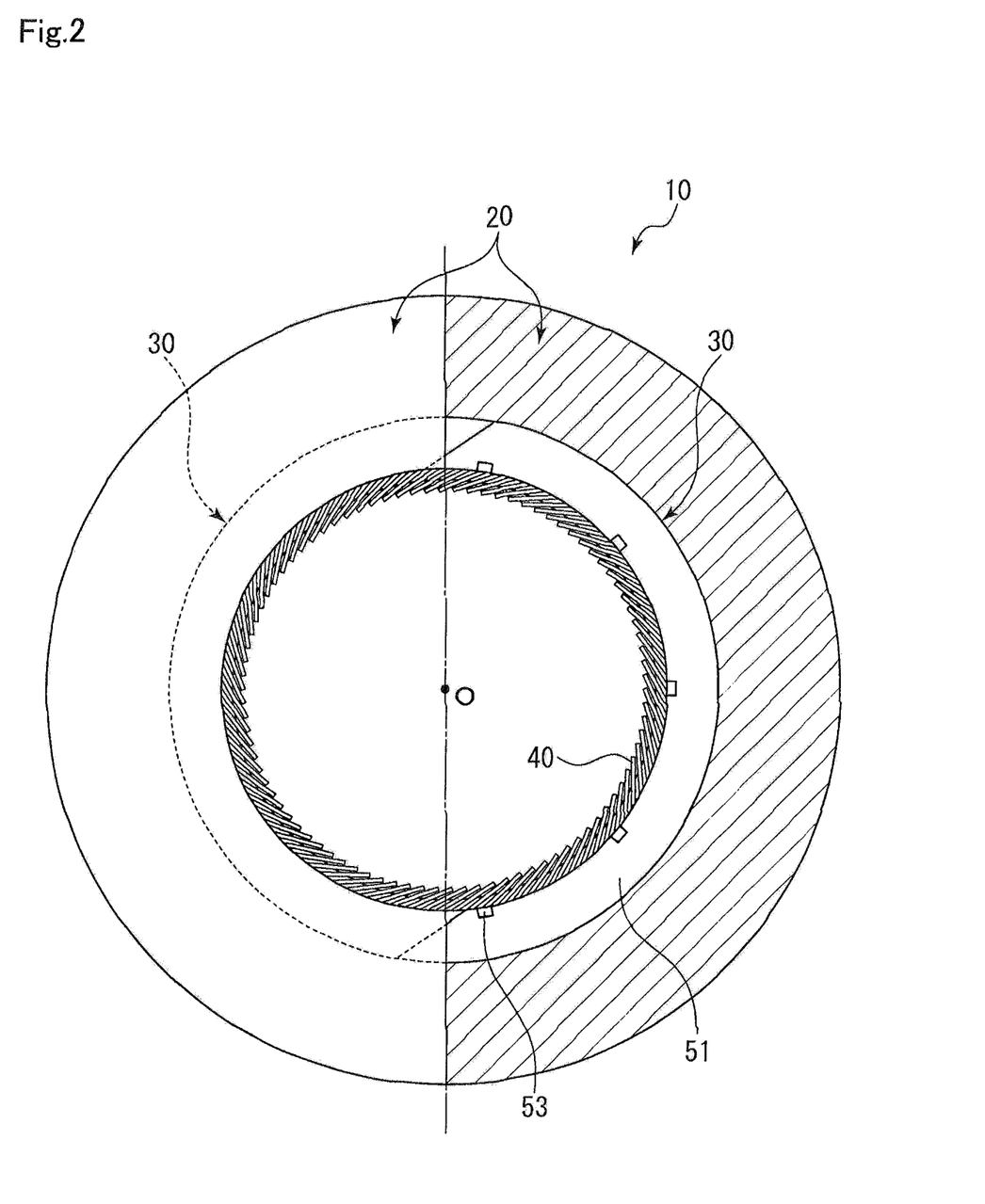
FIG. 2 is a side view showing part of the split type brush seal device of the first embodiment.
Figure 3A:
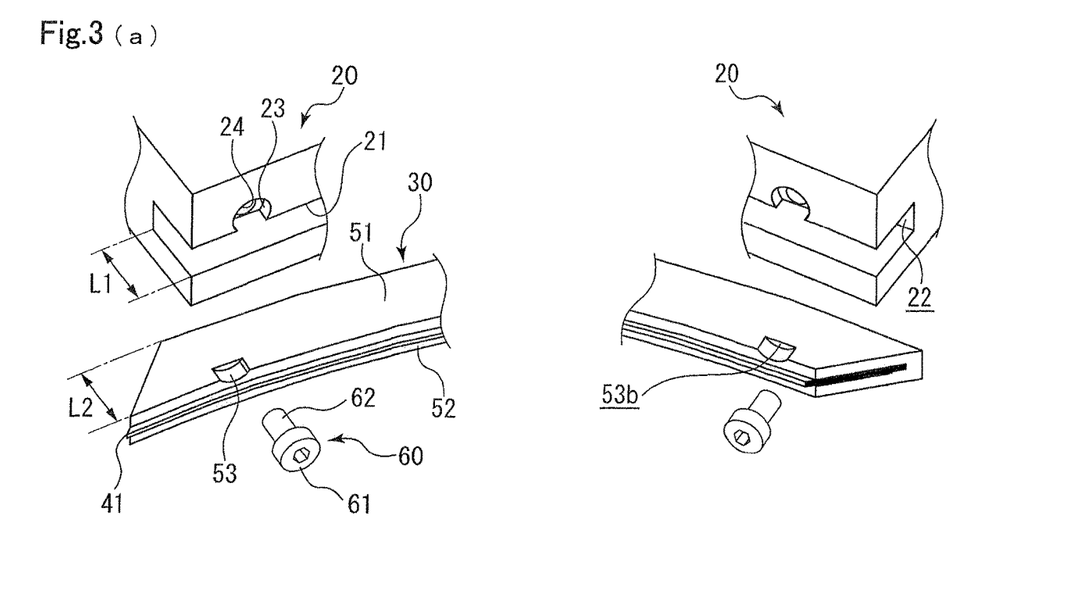
FIG. 3(a) is a view showing a state before both end portions of the brush seal piece are fastened.
Figure 3B:
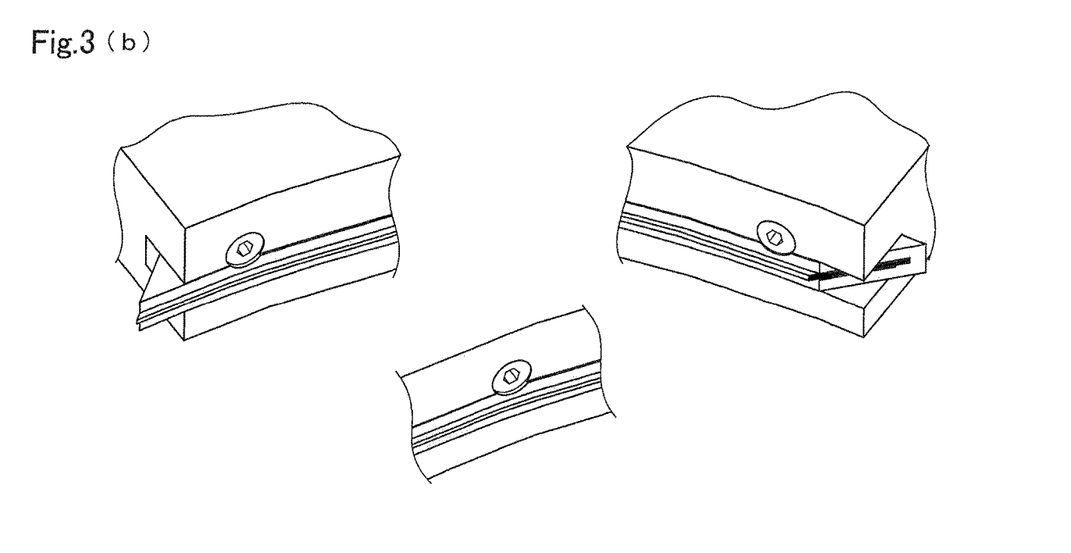
FIG. 3(b) is a view showing a state after both the end portions and a center portion are fastened.

A brush seal according to a first embodiment will be described with reference to FIGS. 1 to 4, 10, 11. In the following description, the left-to-right direction on the paper plane of FIG. 1 is the axial direction, the direction extending in a radial manner from center O of FIG. 2 is the radial direction, and the direction running along the circumference equally distant from the center O is the circumferential direction. It should be noted that a brush seal piece is schematically shown in FIGS. 3 and 4, and one example of the brush seal piece includes structures shown in FIGS. 1, 10, 11.

FIG. 1 shows an example where a split type brush seal device is assembled in a rotary machine such as a turbine. Brush seal pieces 30 are arranged in a channel shape housing portion 21 (attached portion) formed in a housing 20 (attached member) serving as a stator of the rotary machine. By bringing distal ends of wire rods 41 close to or into contact with a rotor 12 of the rotary machine, a sealed gas such as steam and fuel gas of a high pressure side region H inside the rotary machine is suppressed from leaking out to a low pressure side region L. A split type brush seal device 10 is formed in a ring shape in which two brush seal pieces 30, 30 divided in the circumferential direction are coupled and housed in the housing portions 21, 21 of two housings 20, 20 divided in the circumferential direction (FIG. 2).

In a brush 40, an outer circumference of the bundled wire rods 41 is integrated by welding, and this outer circumference serves as an attachment portion 42. The brush seal piece 30 mainly includes a low pressure side metal plate 51 (plate), a high pressure side metal plate 52 (plate), and the brush 40. The brush 40 is nipped by the metal plates 51, 52 and temporarily fixed to an assembling welding jig 70 (FIG. 11), and three parts consisting of the attachment portion 42 and the metal plates 51, 52 are assembled by electron-beam welding 32 in a state where the metal plates 51, 52 are placed along a curvature of the assembling welding jig 70. It should be noted that the low pressure side metal plate 51 and the high pressure side metal plate 52 will be also simply referred to as the metal plates 51, 52.

In the brush seal piece 30, the low pressure side metal plate 51 is fastened and fixed to the housing 20 by bolts 60 (fastening means or fastening members) from the radially inner circumferential side in a state where major parts are housed in the housing portion 21. In detail, shaft portions 62 of the bolts 60 and screw holes 24 of the housing 20 are fastened by screwing, and part of head portions 61 of a larger diameter than the shaft portions 62 are abutted with bottom faces 53b (pressure receiving portions) of recess portions 53 (receiving portions) having arch shape sections of the low pressure side metal plate 51, so that a biasing force in the radial direction is applied to the brush seal piece 30. It should be noted that substantially cylindrical spot faces to house the head portions 61 are formed by the recess portions 53 and recess portions 23 of the housing 20. The recess portions 53 are formed by pressing, cutting, or the like.

Regarding the wire rods 41, a wire diameter is 0.05 to 0.5 mm, and a material is steel, a nickel base alloy, a cobalt base alloy, ceramics, or the like. A material of both the metal plates 51, 52 is preferably stainless, chromium steel, or the like.

An assembling order of the split type brush seal device 10 is as follows. By using the jig of FIG. 11, the brush 40 is nipped by the metal plates 51, 52 and temporarily fixed to the assembling welding jig 70, and three parts consisting of the attachment portion 42 and the metal plates 51, 52 are assembled by the electron-beam welding 32 to be the brush seal piece 30 in a state where an external force is added to the metal plates 51, 52 and the metal plates are forcibly placed along the curvature of the assembling welding jig 70. The curvature of both the metal plates 51, 52 of the brush seal piece 30 may be in an acceptable range with respect to a curvature of a bottom face 22 of the housing portion 21, and there is no need to be the substantially same as in the conventional example. It should be noted that the acceptable range may be a range in which the curvature of both the metal plates 51, 52 can be forcibly and substantially matched with the curvature of the bottom face 22 by a biasing force by fastening of the bolts 60, for example, the range in which a difference between both the curvatures is 10% or less.

Figure 4A:
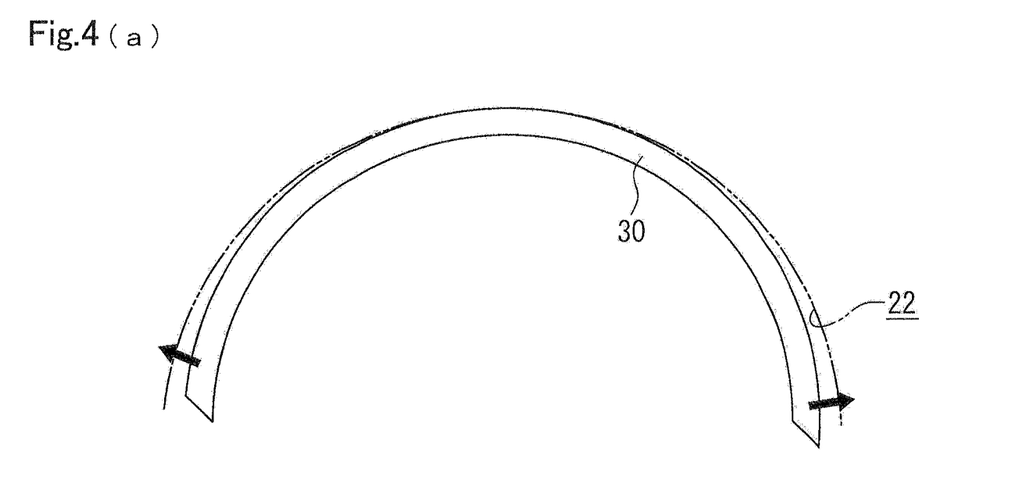
FIG. 4(a) is an illustrative view of a case where the curvature of the brush seal piece is greater than an attached portion.
Figure 4B:
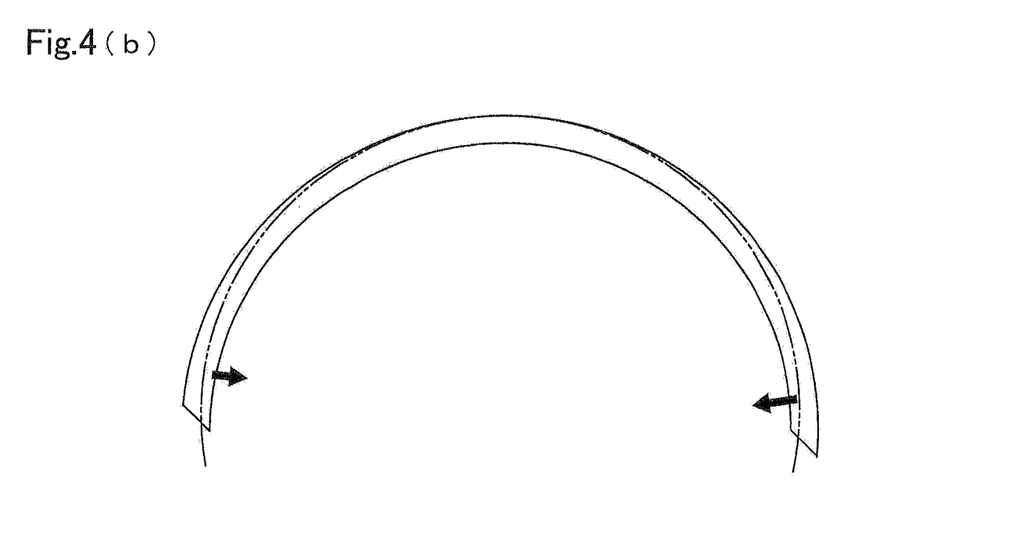
FIG. 4(b) is an illustrative view of a case where the curvature of the brush seal piece is smaller than the attached portion.

Next, after the brush seal piece 30 is inserted into the housing portion 21 from the radially inner side, three bolts 60 are screwed into the screw holes 24 from the radially inner side, so that the brush seal piece 30 is fixed to the housing 20. As shown in FIG. 4(a), when the curvature of the brush seal piece 30 is greater than the curvature of the bottom face 22 of the housing portion 21, the brush seal piece 30 is forcibly deformed so that both end portions are expanded in the arrow directions. Meanwhile, when the curvature is smaller, the brush seal piece is forcibly deformed so as to be crushed. In a state where the bolts 60 are fastened, the recess portions 53 of the metal plate 51 receive the biasing force from the bolts 60. Thus, internal stress generating moment about curvature center is generated in both the metal plates 51, 52 in the direction in which the difference from the curvature of the bottom face 22 of the housing portion 21 is increased. It should be noted that the curvature of the bottom face 22 of the housing portion 21 indicates the curvature of the housing portion 21. Thus, the curvature of the bottom face 22 will be simply called as the curvature of the housing portion 21.

In such a way, the curvature of both the metal plates 51, 52 can be approximated to the curvature of the housing portion 21. Thus, both the metal plates 51, 52 can be applied to the housing portion 21 having the approximated and acceptable curvature. As a result, the number of jigs for assembling the brush seal pieces 30 can be reduced.

When depth L1 serving as radial length of the housing portion 21 (refer to FIG. 3) and depth L2 serving as radial length of both the metal plates 51, 52 are the same, an inner circumferential face of the housing 20 and inner circumferential faces of both the metal plates 51, 52 are flush with each other in an assembled state. Therefore, the bolts 60 may be fastened with both the inner circumferential faces as benchmarks for assembling positions. Thus, positioning in the depth direction at the time of assembling is easy.

The metal plates 51, 52 are attached along the curvature of the housing portion 52. Thus, even when the curvature is different between the metal plates 51, 52 and the housing portion 21 before attachment, the distal ends of the wire rods 41 of the adjoining brush seal pieces 30 are formed in a continuous arc shape in the circumferential direction in a state where the bolts 60 are fastened, and a distance between the distal ends of the wire rods 41 and the rotor 12 can be substantially constant. Thus, a necessary sealing performance can be ensured.

The metal plate 51 is fastened to the housing 20 by the bolts 60. Thus, the metal plate 51 is simply attached to the housing 20 with favorable precision.

The bolts 60 are provided only in the low pressure side region L. Thus, no recess portions are provided on an inner circumference of the housing 20 in the high pressure side region H, so that a flow of the sealed gas in this region is not easily disturbed. It should be noted that provision of bolts only in the high pressure side region H is not prevented and bolts may be provided in both the side regions of the low pressure side region L and the high pressure side region H. In a case where the bolts are provided in both the side regions, the bolts of the low pressure side region L and the bolts of the high pressure side region H are preferably arranged in a zigzag way in the circumferential direction.

The direction in which the bolts 60 are fastened is the direction in which the metal plates 51, 52 are deformed so that the curvature of the metal plates 51, 52 is approximated to the curvature of the housing portion 21. Thus, the metal plates 51, 52 can be deformed following a fastening task of the bolts 60, and assembling workability is favorable.

The recess portions 53 are provided at five points in the circumferential direction. Thus, even when the curvature of the brush seal piece 30 is greater (FIG. 4(a)) or smaller (FIG. 4(b)), the brush seal piece 30 can be approximated to the curvature of the housing portion 21 with favorable precision. In order to deal with only the time when the curvature of the brush seal piece 30 is smaller (FIG. 4(b)), the recess portion 53 may also be provided in center in the circumferential direction of the brush seal piece 30.

Second Embodiment

Next, a split type brush seal device according to a second embodiment will be described with reference to FIG. 5. A configuration where a bolt 60 is fastened in the circumferential direction is different from the first embodiment. Description of the same configurations as the first embodiment will be omitted.

A recess portion 23' and a screw hole 24' are formed on a side face of a housing 20, and a recess portion 53' (receiving portion) is provided in a circumferential end portion of a low pressure side metal plate 51. After a brush seal piece 30 is inserted into a housing portion 21 from the radially inner side, the bolt 60 is screwed into the screw hole 24' in the circumferential direction in a state where a curvature of the brush seal piece 30 is forcibly changed to be a curvature of the housing portion 21, so that the brush seal piece 30 is fixed to the housing 20.

There is no need for providing the bolt 60 on the distal end side of wire rods 41. Thus, the design flexibility of the low pressure side metal plate 51 on the distal end side of the wire rods 41 is high.

Third Embodiment

Next, a split type brush seal device according to a third embodiment will be described with reference to FIGS. 6, 7. Three examples in which an outer shape of a brush seal piece 30 and a housing portion of a housing 20 are different from the first embodiment will be described. Description of the same configurations as the first embodiment will be omitted.

Figure 5:
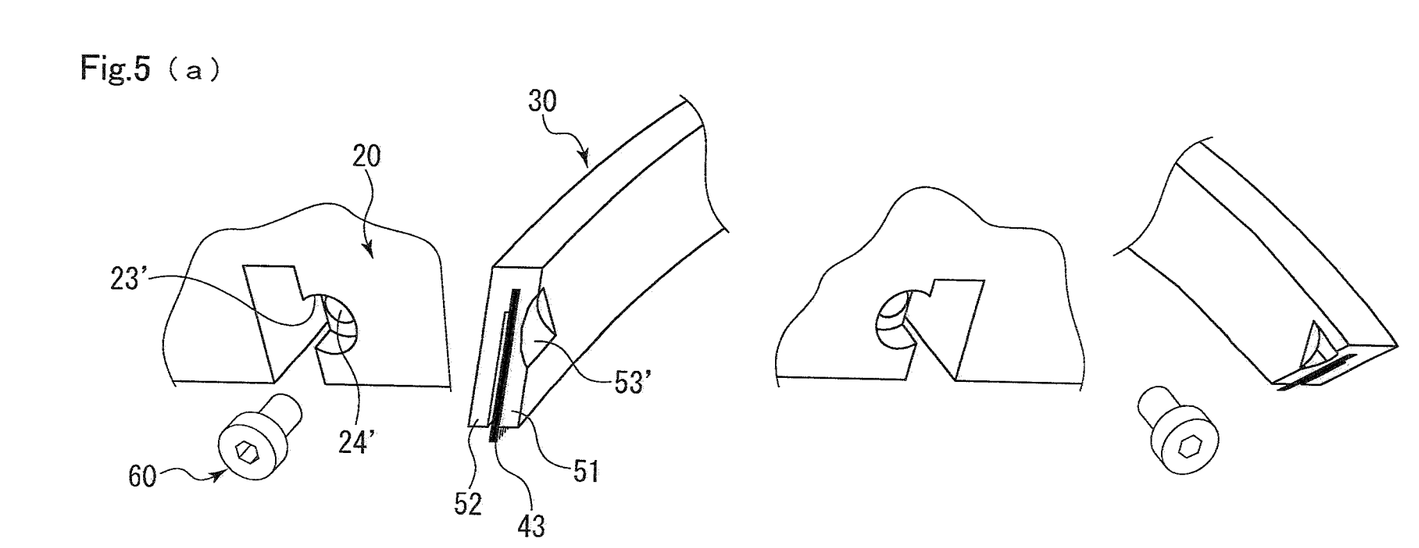
FIG. 5 is an illustrative view showing assembling of a brush seal piece of a second embodiment.
Figure 6A:
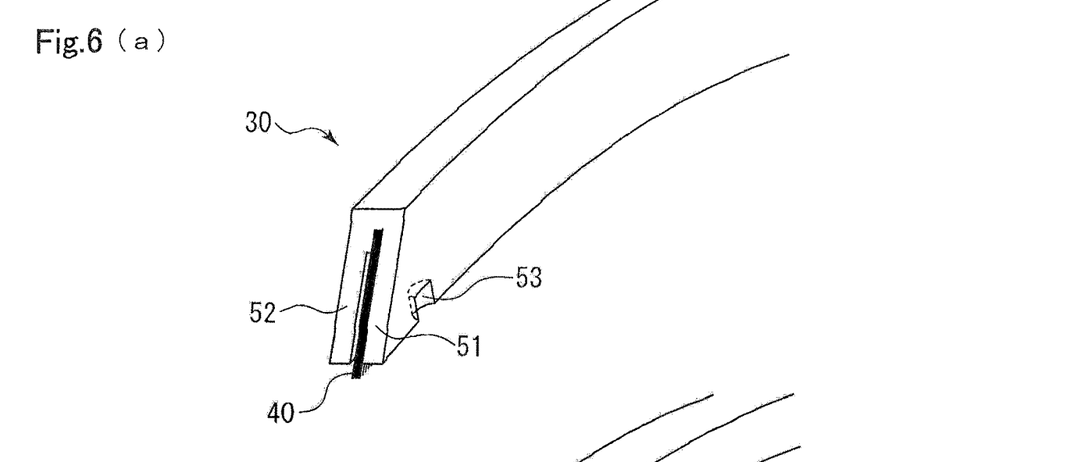
FIG. 6(a) shows a plate having a substantially rectangular section.

The brush seal piece 30 shown in FIG. 6(a) has the same configuration as the brush seal piece 30 shown in FIGS. 3, 5.

Figure 6B:
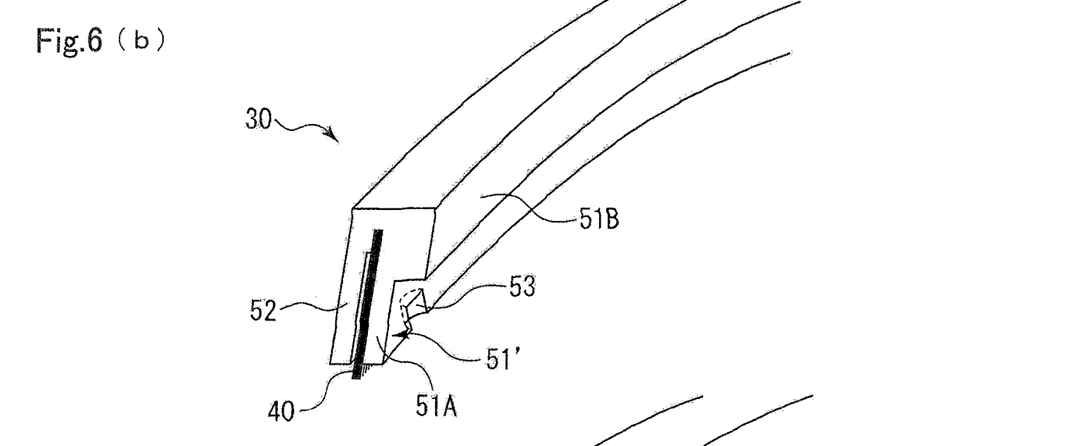
FIG. 6(b) shows a plate having a substantially L shape section.

As shown in FIG. 6(b), a low pressure side metal plate 51' may have a plate shape portion 51A and a projecting portion 51B which is axially longer than the plate shape portion 51A. In this case, the brush seal piece 30 has the projecting portion 51B. Thus, the brush seal piece 30 is inserted into a housing 21' having a substantially L shape section (FIG. 7(b)) in the circumferential direction, fixed to the housing 20 by a bolt 60, and assembled.

Figure 6C:
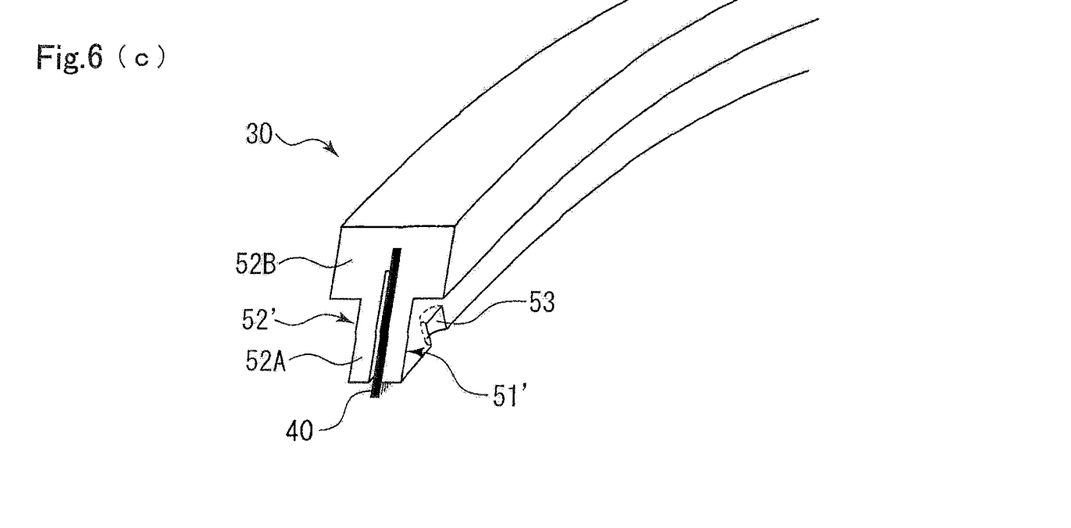
FIG. 6(c) shows a plate having a substantially T shape section.

As shown in FIG. 6(c), a high pressure side metal plate 52' is formed in the same way as the low pressure side metal plate 51' of FIG. 6(b). In this case, the brush seal piece 30 is inserted into a housing portion 21" having a substantially T shape section (FIG. 7(c)) in the circumferential direction, fixed to the housing 20 by the bolt 60, and assembled.

Figures 7A, 7B, 7C:
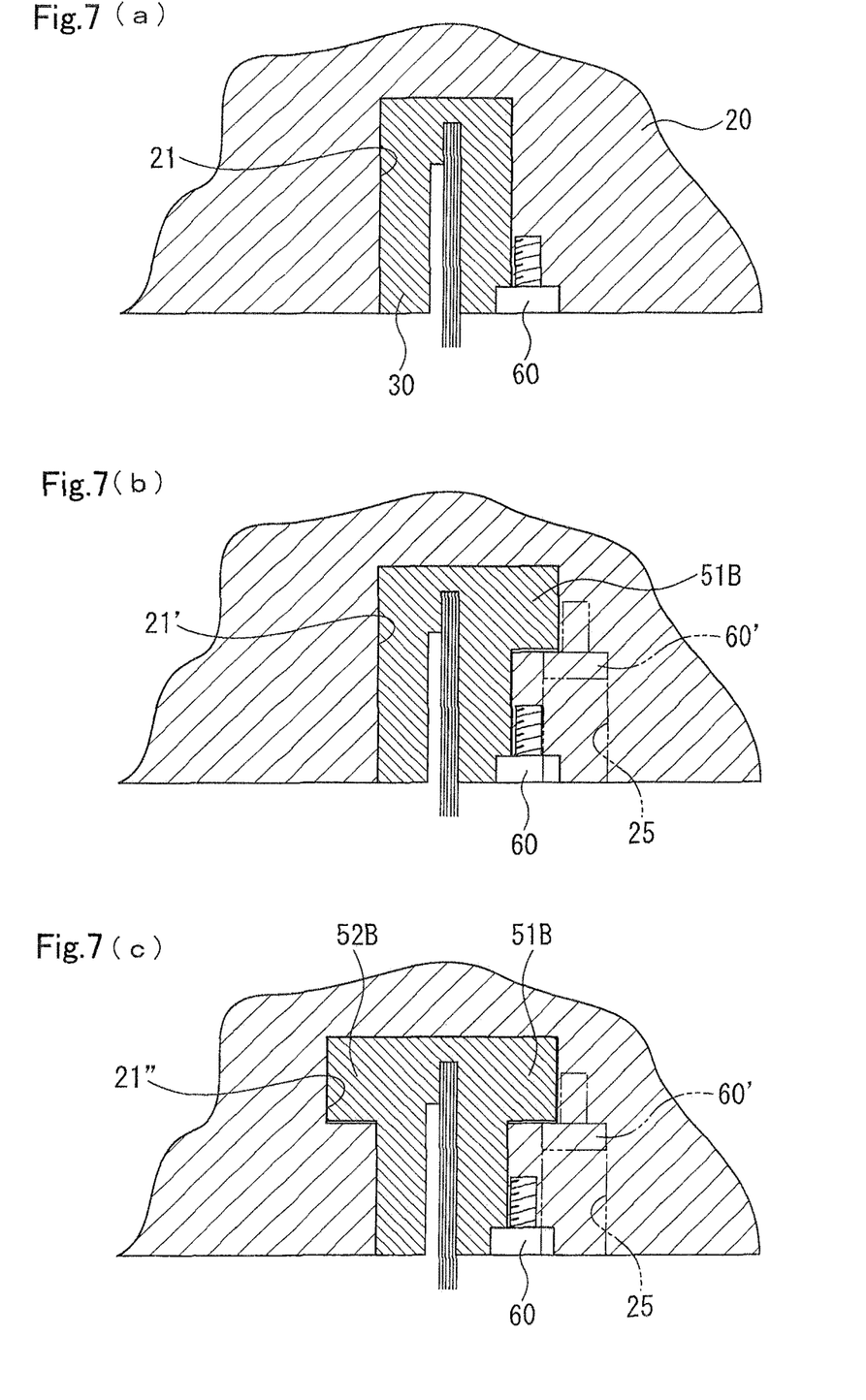
FIGS. 7(a), 7(b), 7(c) are sectional views corresponding to the brush seal pieces of FIGS. 6(a), 6(b), 6(c), respectively.

In a case where the brush seal piece 30 has the projecting portion 51B as in FIGS. 6(b), 6(c), instead of biasing of the plate shape portion 51A to the inner circumferential side, the projecting portion 51B can also be biased by a bolt 60' as shown by broken lines in FIGS. 7(b), 7(c). In this case, there is a need for providing a bolt insertion hole 25 in the housing 20. In a case of FIG. 6(c), a projecting portion 52B can also be biased by the bolt.

It should be noted that in the examples of FIGS. 6(a) to 6(c), a position where a recess portion 53 is provided may be a circumferential end portion as well as the second embodiment.

Fourth Embodiment

Next, a split type brush seal device according to a fourth embodiment will be described with reference to FIGS. 8, 9. The number of brush seal pieces 30 arranged in one housing 20 is different from FIG. 2. The fourth embodiment is particularly suitable for a configuration where bolts 60 are fastened in the circumferential direction as in the second embodiment. Description of the same configurations as the first and second embodiments will be omitted. In FIGS. 8, 9, recess portions 53' corresponding to the second embodiment are omitted.

Figure 8A:
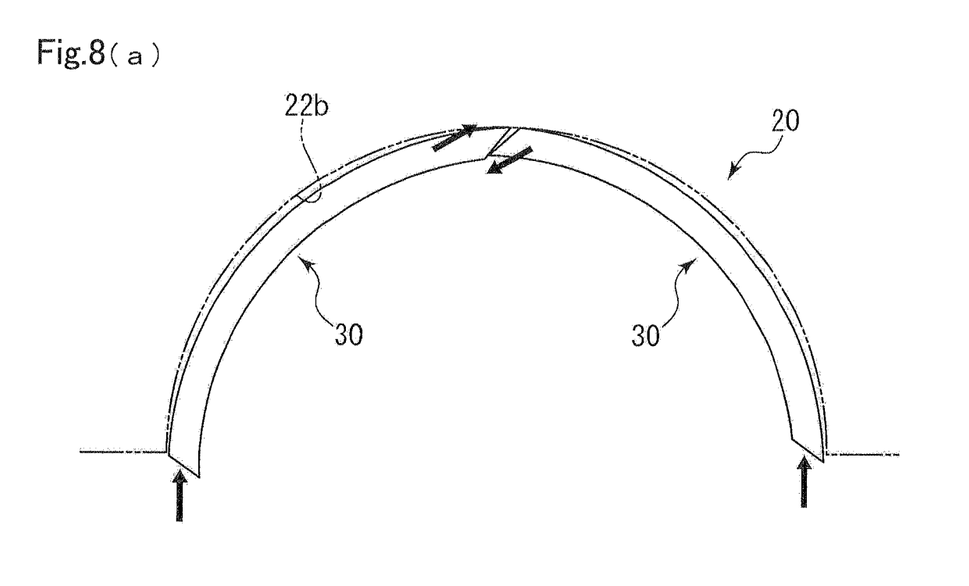
FIG. 8(a) is an illustrative view of a case where two brush seal pieces are arranged in an attached member.
Figure 8B:
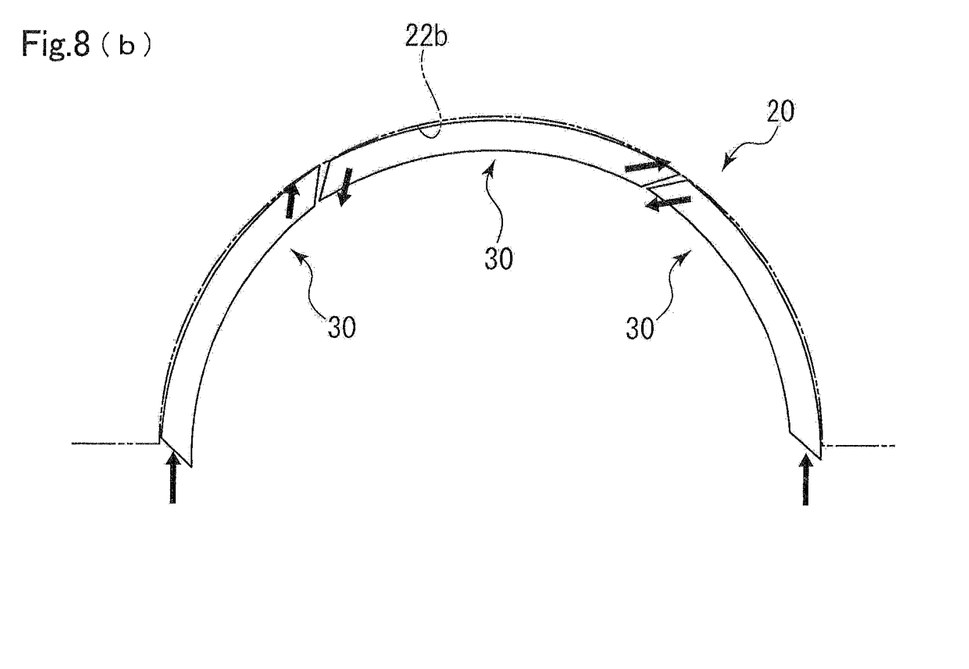
FIG. 8(b) is an illustrative view of a case where three brush seal pieces are arranged in the attached member.
Figure 9:
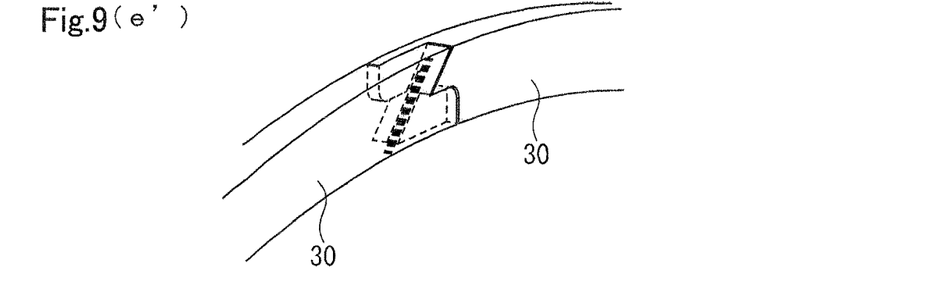
Figure 9A:
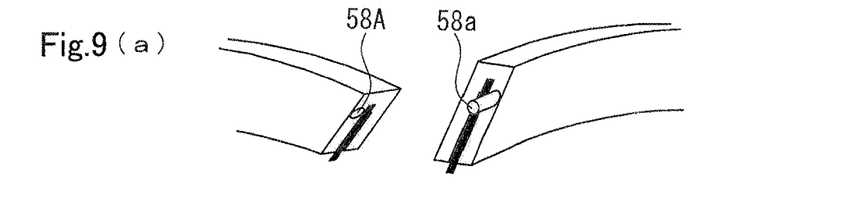
FIGS. 9(a), (b), (c), (d), (e) and (e') are perspective views for illustrating connection of the adjoining brush seal pieces of the fourth embodiment.
Figure 9B:
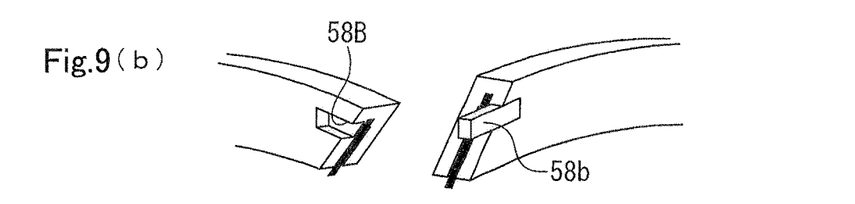
Figure 9C:
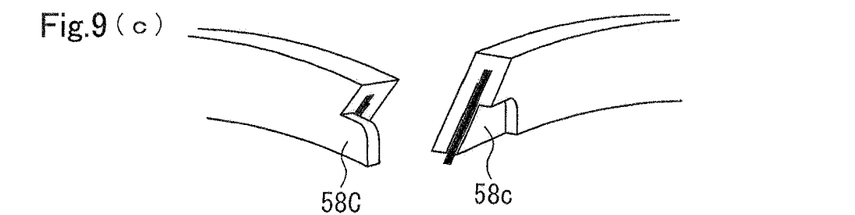
Figure 9D:
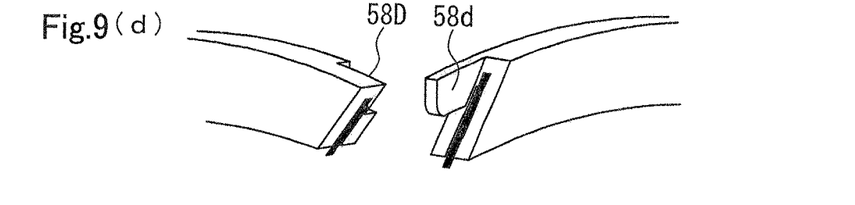
Figure 9E:
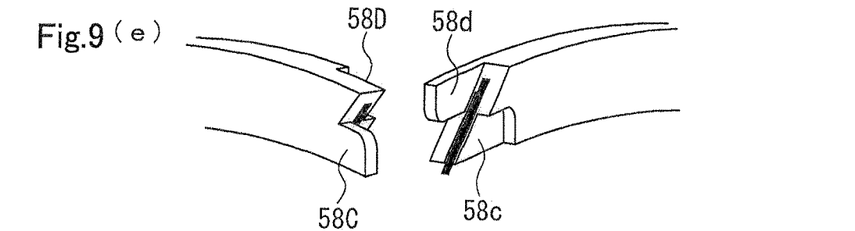

In a case where plural brush seal pieces 30 are arranged in one housing 20, due to inclination of circumferential end faces of the brush seal pieces 30, upon receiving a force from the circumferential direction, the circumferential end faces of the adjoining brush seal pieces 30, 30 are moved along the inclination as shown by arrows in FIGS. 8(a), 8(b). Therefore, a mating structure for regulating radial movement mutually with the adjoining brush seal piece 30 is preferably provided in a circumferential end portion of the brush seal piece 30.

As the mating structure, pin mating using an insertion hole 58A and an insertion pin 58a, key mating using an insertion groove 58B and a key member 58b, overlap mating using a circumferentially projecting portion 58C of a low pressure side metal plate 51 and a circumferential cutout 58c, overlap mating using a circumferentially projecting portion 58D of a high pressure side metal plate 52 and a circumferential cutout 58d, and overlap mating using the circumferentially projecting portion 58C of the low pressure side metal plate 51 and the circumferential cutout 58c, and the circumferentially projecting portion 58D of the high pressure side metal plate 52 and the circumferential cutout 58d can be adopted as shown in FIGS. 9(a) to 9(e). For example, as shown in FIG. 9(e'), the adjoining brush seal pieces 30, 30 can be connected by using the mating structure of FIG. 9(e).

By using the mating structure in such a way, even in a case where the brush seal piece 30 of the second embodiment is further divided in the circumferential direction, that is, even when the number of portions into which the brush seal piece is divided is equal to or more than the number of the bolts 60 (two bolts), the brush seal device of the fourth embodiment can be assembled without increasing the bolts 60. Even when the circumferential end face of the brush seal piece 30 is inclined, the adjoining brush seal pieces 30, 30 can regulate radial movement mutually with each other. Irrespective of a shape of the circumferential end face (shape such as inclination and non-inclination) of the brush seal piece 30, by integrally and temporarily holding the plural brush seal pieces 30, 30 . . . by the mating structure, a task of housing the brush seal pieces 30, 30 . . . in a housing portion 21 is easily performed.

The embodiments of the present invention are described above with the drawings. However, specific configurations are not limited to these embodiments and the present invention also includes modifications and additions within a range not departing from the gist of the present invention.

For example, the example where the rotor 12 on the inner circumferential side of the split type brush seal device 10 is sealed is described in the above embodiments. However, a rotor on the outer circumferential side of a split type brush seal device may be sealed. In this case, a distal end of a brush on the radially outer side is brought close to or into contact with the rotor.

As a means that attaches and fixes the brush seal piece 30 to the housing 20, the bolts 60 having screw portions are described as an example. However, the means may be fastening members other than the bolts such as clips. Further, fixing may be done by welding other than the fastening members or press-fitting into the housing 20. In sum, the means may be any means that deforms the brush seal piece 30 into a desired curvature in a state where the brush seal piece 30 is attached to the housing 20.

As the plate, the metal plate is described as an example. However, a material of the plate is not limited to metal. The plate may be anything to satisfy specifications such as mechanical strength, heat resistance, and corrosion resistance, and to be forcibly deformed to change a curvature.

The example where the curvature of the brush seal piece 30 is changed by the bolts 60 at the time of attaching the brush seal piece 30 to the housing 20 is described. However, before attaching to the housing 20, the brush seal piece 30 may be deformed (for example, by plastic deformation) by a biasing means such as a roller, and the curvature of the brush seal piece 30 is changed. In this case, when the curvature substantially matches between the brush seal piece 30 and the housing portion 21 of the housing 20, deformation of the brush seal piece 30 by the bolts 60 is not required. Further, the biasing means such as a roller and the biasing means such as the bolts 60 described in the first to fourth embodiments may be used together.

As the attached member, the housing 20 serving as the stator is described as an example. However, this housing 20 may form a casing of the rotary machine or may be detachably attached to the casing. The housing 20 may be divided in the axial direction.

REFERENCE SIGNS LIST

10 Split type brush seal device
20 Housing (attached member)
21 Housing portion (attached portion)
23 Recess portion (receiving portion)
24 Screw hole
30 Brush seal piece
40 Brush
51, 51' Low pressure side metal plate (plate)
52, 52' High pressure side metal plate (plate)
53, 53' Recess portion (receiving portion)
53b Bottom face
60 Bolt (biasing means, fastening member)
H High pressure side region
L Low pressure side region

The invention claimed is:

1. A split type brush seal device comprising:
a plurality of brush seal pieces having bundled wire rods; and
an attached member provided with a groove to which the plurality of brush seal pieces is attached in the circumferential direction, wherein:
each of the brush seal pieces has a plate of arc shape to which the bundled wire rods are fixed,
the attached member is provided with at least a screw hole which is opened at an inner periphery surface of the attached member and which has a center axis extending in a radial direction of the attached member, the screw hole being formed so as to be close to the plate but independent from the groove of the attached member,
the split type brush seal device further comprises a bolt having a screw portion and a head portion having a diameter larger than that of the screw portion,
the screw portion of the bolt is screwed into the screw hole of the attached member but not screwed into the plate,
the plate is provided with a first recess portion which has an arc shape in a circumferential cross section and which is capable of engaging with part of an periphery surface of the head portion of the bolt,
the diameter of the head portion has such a size that the head portion overlaps with the plate upon an engagement of the screw portion of the bolt and the screw hole of the attached member, and
the head portion of the bolt is, upon a screwing of the bolt into the screw hole, engaged with the first recess portion of the plate thereby fixing the plate to the attached member in a circumferential direction, and then brought into contact with the plate before the attached member thereby forcibly causing a curvature of the plate to approximate to a curvature of the groove of of the attached member.

2. The split type brush seal device according to claim 1, wherein:
the plurality of brush seal pieces is attached to the attached member; and
each of the brush seal pieces has a mating structure for regulating radial movement mutually with the adjoining brush seal piece.

3. The split type brush seal device according to claim 1, wherein
the attached member has a second recess portion which houses the head portion of the bolt in a cooperation with the first recess portion of the plate upon the screwing of the bolt into the screw hole.

4. The split type brush seal device according to claim 3, wherein:
the plurality of brush seal pieces is attached to the attached member; and
each of the brush seal pieces has a mating structure for regulating radial movement mutually with the adjoining brush seal piece.

* * * * *